United States Patent [19]

Bujadoux et al.

[11] Patent Number: 4,755,572
[45] Date of Patent: Jul. 5, 1988

[54] PROCESS FOR THE MANUFACTURE OF HOMOPOLYMERS OR COPOLYMERS OF ETHYLENE

[75] Inventors: Karel Bujadoux, Lens; Jean-Pierre Machon, Bethune; Serge Biechlin, Houdain, all of France

[73] Assignee: Societe Chimique des Charbonnages S.A., France

[21] Appl. No.: 932,329

[22] Filed: Nov. 19, 1986

Related U.S. Application Data

[63] Continuation of Ser. No. 565,192, Dec. 23, 1983, abandoned.

[30] Foreign Application Priority Data

Dec. 24, 1982 [FR] France ............................... 82 21737

[51] Int. Cl.⁴ .............................................. C08F 2/42
[52] U.S. Cl. ........................................ 526/82; 526/84; 528/488; 528/491
[58] Field of Search ......................... 526/82, 68, 84; 528/488, 491

[56] References Cited

U.S. PATENT DOCUMENTS

| | | | |
|---|---|---|---|
| 3,242,149 | 3/1966 | Giachetti et al. | 526/82 X |
| 3,708,465 | 1/1973 | Dietrich et al. | 526/84 |
| 4,105,609 | 8/1978 | Machon et al. | 526/84 X |
| 4,168,356 | 9/1979 | Levresse et al. | |
| 4,331,791 | 5/1982 | Rohlfing et al. | 526/68 X |
| 4,342,853 | 8/1982 | Durand et al. | 526/68 |
| 4,412,025 | 10/1983 | Corwin et al. | 524/243 X |
| 4,419,473 | 12/1983 | Mahaffey, Jr. | 524/104 |
| 4,551,509 | 11/1985 | Takayuki et al. | 526/68 |

FOREIGN PATENT DOCUMENTS

| | | | |
|---|---|---|---|
| 1150 | 3/1979 | European Pat. Off. | 528/483 |
| 2841646 | 4/1980 | Fed. Rep. of Germany. | |
| 832996 | 4/1960 | United Kingdom | 528/494 |
| 884116 | 12/1961 | United Kingdom. | |
| 967619 | 8/1964 | United Kingdom. | |
| 1451292 | 9/1976 | United Kingdom. | |
| 467909 | 5/1975 | U.S.S.R. | 526/84 |

OTHER PUBLICATIONS

Polyolefin Production Processes Chemical Technology Review, No. 70, Sittig, p. 324, 1976.

*Primary Examiner*—Paul R. Michl
*Attorney, Agent, or Firm*—Finnegan, Henderson Farabow, Garrett and Dunner

[57] ABSTRACT

A process for the continuous manufacture of homopolymers of an ethylene monomer and copolymers of an ethylene monomer with at least one α-olefin containing 3 to 8 carbon atoms. The monomers and a catalytic system are introduced into a first stage reactor to form a reaction medium for polymerizing the monomers. During a first stage, when the polymerization is substantially complete, a first compound, which is capable of reducing a transition metal of the catalytic system, is introduced into the reaction medium.

27 Claims, 1 Drawing Sheet

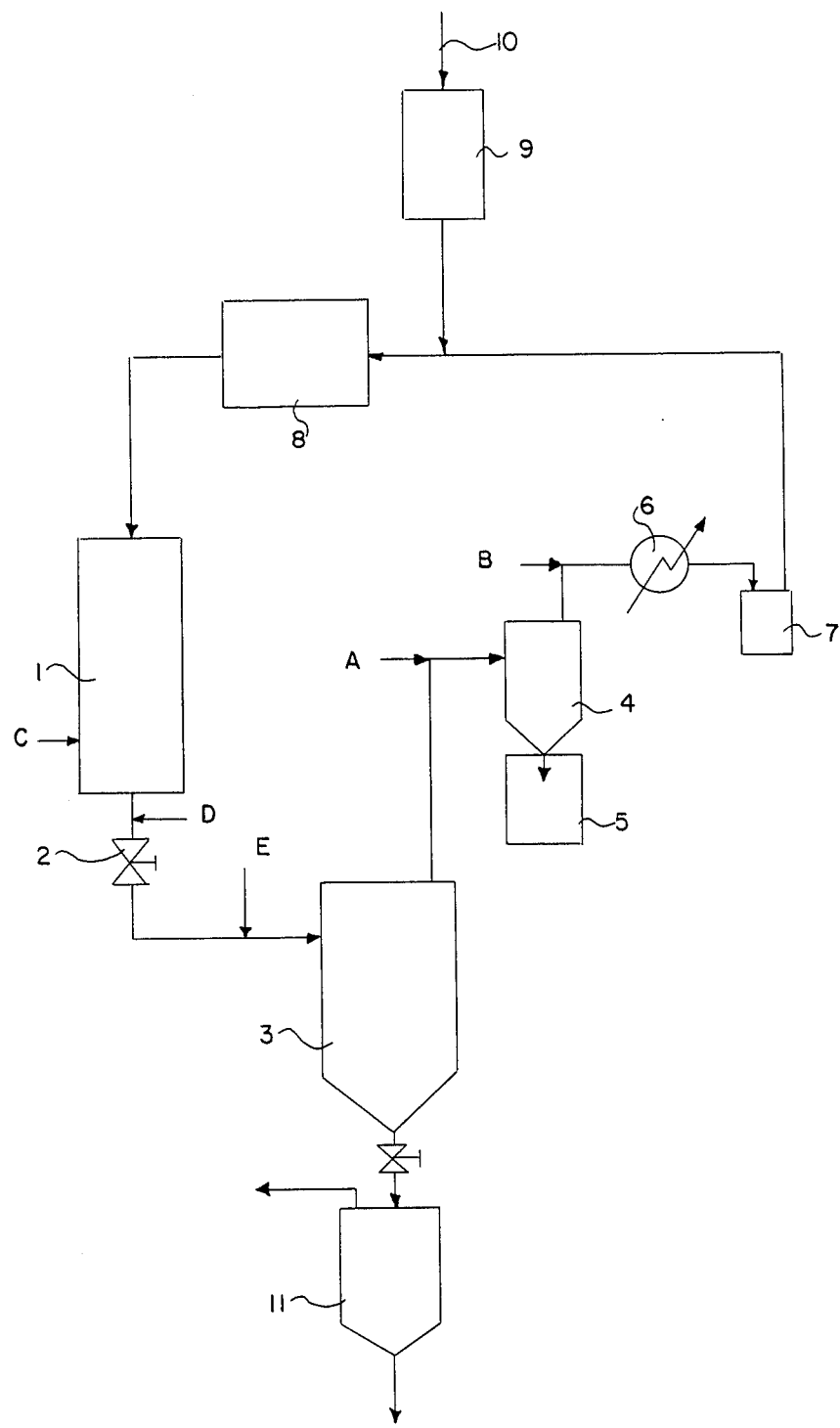

PROCESS FOR THE MANUFACTURE OF HOMOPOLYMERS OR COPOLYMERS OF ETHYLENE

This application is a continuation of application Ser. No. 565,192, filed Dec. 23, 1983, now abandoned.

FIELD OF THE INVENTION

The present invention relates to the polymerization of ethylene and, more particularly, to a continuous process for the manufacture of homopolymers of ethylene or copolymers of an ethylene monomer with at least one α-olefin monomer containing 3 to 8 carbon atoms.

BACKGROUND OF THE INVENTION

Previously, French Pat. No. 2,202,899 disclosed the homopolymerization of ethylene and the copolymerization of ethylene with at least one α-olefin, continuously, in the presence of a Ziegler-type catalytic system, at high temperature and under high pressure.

Apparatus of the '899 French Patent comprised at least one reactor having at least one reaction zone, at least one separator, and one or more conduits for recycling the unreacted monomers of ethylene and α-olefin, if any, towards a secondary compressor. The secondary compressor receives fresh monomers from a primary compressor, and the secondary compressor also feeds monomers into the reactor at the chosen polymerization pressure.

In a process of this type, traces of the components of the catalytic system can be carried over with the gases. This carry-over can cause a continuation of the polymerization both before and during the separation of the polymers or copolymers also formed from the unreacted monomers. Such a carry-over can cause a reduction in the average molecular weight of the polymers or copolymers, which are collected in the separator.

The continuation of the polymerization or the copolymerization in either the conduit connecting the reactor to the separator or in the separator itself is very inconvenient, because the continued polymerization requires the unpredictable adjustment of the operating settings of the reactor. Similarly, in the separator, the polymerization can cause the appearance of a thermal gradient between the upper and lower parts of the separator. Consequently, it is very difficult, under these conditions, to obtain a polymer or a copolymer having the required properties.

The carry-over of the traces of the components of the catalytic system can, moreover, cause the polymerization of the monomers that are recycled in the recycle conduits from the separator. The polymers or copolymers that are formed, generally are of very low molecular weight. Typically, the polymers or copolymers have a molecular weight below 2,000, and have the appearance of oils, greases, or waxes, under normal conditions of temperature and pressure.

Traps are generally provided in the recycle conduits to collect the polymers or copolymers of very low molecular weight. However, these polymers or copolymers can also be deposited on the inner wall of the recycle conduits, and their molecular weight can increase as a consequence of the continuous flow of the recycle gases, which contain traces of the components of the catalytic system. Although the polymers or copolymers of very low molecular weight cause little inconvenience since they are easy to remove, the polymers or copolymers of higher molecular weight, having a molecular weight greater than 2,000, are a major nuisance since they can cause a pressure drop in the apparatus and even result in the blocking of the recycle conduits.

French Pat. No. 2,302,305 describes a polmerization process that injects, at the end of the reaction, at least one product selected from the alkali metal salts or alkaline earth metal salts of carboxylic acids. The quantity of the product that is injected is sufficient to cause the deactivation of the catalyst. The catalyst, preferably, has both a transition metal derivative and an activator constituent. The injection of the metal salt takes place, preferably, close as possible to the reactor outlet valve.

The process of the '305 French Patent is not totally satisfactory, because a thermal gradient appears in the separator. Although the thermal gradient is slightly reduced, it is still too high. Furthermore, the concentration of but-2-ene formed by the isomerization of but-1-ene is also too high. The presence of but-2-ene is particulary inconvenient, because it does not copolymerize with the ethylene and the α-olefins. Consequently, the but-2-ene accumulates in the recycled gases.

French Pat. Nos. 1,267,771 and 1,268,693 disclose processes for preparing, at a low pressure and a low temperature, polymers of vinyl hydrocarbons. A catalyst is used that comprises an organic compound of a metal from groups IA to IIIA and an organic compound of a metal of group IIB, such as Zn, Cd, Hg, and Mg. The organic compound of a metal of Group IIB acts as a co-activator.

German Pat. No. 2,841,646 describes a process for interrupting and restarting the polymerization and copolymerization of olefins at a low pressure and a low temperature, by adding at least 0.5 millimole of CO or, preferably, $CO_2$ per liter of reaction mixture. This process is applied to the polymerization or copolymerization of olefins in the presence of a catalytic system comprising a titanium trichloride modified by an electron donor and a chlorodialkylaluminum. The restarting of the polymerization is possible, and it is found that, under the conditions described, carbon monoxide is not a deactivator of the catalyst.

SUMMARY OF THE INVENTION

The object of the present invention is to overcome the disadvantages of previous processes by providing a process that interrupts the growth of the polymers that are formed at the end of the reaction and in the conduits for recycling the gases. In particular, the present process controls the separator to reduce considerably or even eliminate the temperature gradient. The present process avoids the formation of polymers of high molecular weight in the recycle conduits and the resulting increase in the pressure drop in the conduits. The process further reduces the isomerization of but-1-ene to but-2-ene.

To achieve these and other objectives, the present invention provides a process for the continuous manufacture of either homopolymers of ethylene or copolymers of ethylene with at least one α-olefin containing 3 to 8 carbon atoms. The process introduces either an ethylene monomer or an ethylene monomer and at least one α-olefin monomer containing 3 to 8 carbon atoms, and a catalytic system into a first stage reactor to form a reaction medium, for polymerizing the monomers at a temperature between 180° and 320° C. and at a pressure between 300 and 2,500 bars. The catalytic system comprises a halogenated compound of a transition metal from groups IVa to VIa of the Periodic System and at least one activator selected from the group consisting of hydrides and organometallic compounds, having a metal of Groups I to III of the Periodic System. The molar ratio of the activator to the transition metal compound in the catalytic system is between 1 and 10. When the polymerization is substantially complete, a first compound capable of reducing the transition metal of the catalytic system is introduced into the reaction medium during a first stage. The reaction medium is separated into the formed polymers and copolymers and the unreacted monomers during a second stage at a pressure of between 100 and 500 bars. The unreacted monomers are recycled during a third stage. The recycled unreacted monomers are then recompressed during a fourth stage up to the polymerization pressure.

BRIEF DESCRIPTION OF THE DRAWINGS

The accompanying drawing, which is incorporated in and constitutes a part of the specification, illustrates at least one embodiment of the invention and, together with the description, serves to explain the principles of the invention.

The FIGURE is a schematic diagram of a polymerization plant for carrying out the present process.

DESCRIPTION OF THE PREFERRED EMBODIMENT

The present invention provides a process for the continuous manufacture of either homopolymers of ethylene or copolymers of ethylene with at least one α-olefin containing 3 to 8 carbon atoms. The process includes the steps of introducing either an ethylene monomer or an ethylene monomer and at least one α-olefin monomer containing 3 to 8 carbon atoms, and a catalytic system into a first stage reactor to form a reaction medium, for polymerizing the monomers at a temperature between 180° and 320° C. and at a pressure between 300 and 2,500 bars. The catalytic system comprises a halogenated compound ot a transition metal from Groups IVa to VIa of the Periodic System and at least one activator selected from the group consisting of hydrides and organometallic compounds, having a metal of Groups I to III of the Periodic System. The molar ratio of the activator to the transition metal compound in the catalytic system is between 1 and 10.

When the polymerization is substantially complete a first compound capable of reducing the transition metal of the catalytic system is introduced into the reaction medium during a first stage. The reaction medium is separated into the formed polymers and copolymers and the unreacted monomers during a second stage at a pressure of between 100 and 500 bars. The unreacted monomers are recycled during a third stage. The recycled unreacted monomers are then recompressed during a fourth stage up to the polymerization pressure.

The α-olefins, containing from 3 to 8 carbon atoms, can be chosen from the group consisting of propylene, but-1-ene, pent-1-ene, hex-1-ene, the methylpent-1-enes, hept-1-ene, oct-1-ene, and combinations thereof. Preferably, propylene, but-1-ene, hex-1-ene, or mixtures of propylene with but-1-ene, or of but-1-ene with hex-1-ene are used.

The first stage for polymerizing or copolymerizing ethylene is carried out in at least one reactor that has at least one reaction zone. One or more autoclaves or tubular reactors can be employed. To control accurately the melt index of the polymer or copolymer that is formed, the polymerization or copolymerization can be carried out in the presence of up to 2 mole % of a chain transfer agent, such as hydrogen.

The catalytic system comprises a halogenated compound of a transition metal from groups IVa to VIa of the Periodic System and at least one activator selected from the hydrides and the organometallic compounds of metals of Group I to III of the Periodic System.

The halogenated compounds of a transition metal from Groups IVa to VIa of the periodic System can include a compound selected from the following:

(a) violet titanium chloride (TiCl$_3$, $\frac{1}{3}$AlCl$_3$);

(b) a compound of the formula (TiCl$_a$) (MgCl$_2$) y(AlCl$_3$)$_z$ (RMgCl)$_b$, wherein $2 \leq a \leq 3$, $y \geq 2$, $0 \leq z \leq \frac{1}{3}$, and $0 \leq b \leq 1$, alone or mixed with a compound of the formula TiCl$_3$(AlCl$_3$)$_w$ (E.TiCl$_4$)$_x$, wherein $0 \leq w \leq \frac{1}{3}$, $0 \leq x \leq 0.03$ and E is diisoamyl ether or di-n-butyl ether;

(c) a product obtained by contacting a magnesium complex compound, containing at least one compound selected from magnesium monohalides and halomagnesium hydrides, with a halide of titanium or of vanadium, in which the metal has a valency not greater than 3;

(d) a compound of the formula (MX$_a$) (MgX$_2$)$_b$(RMgX)$_c$(HMgX)$_d$, wherein M is a metal from group IVa or Va of the Periodic System, X is a halogen, R is a hydrocarbon radical and $2 \leq a \leq 3.5$, $1 \leq b \leq 30$, $1 < c \leq 8$, and $0 \leq d \leq 10$;

(e) a compound of the formula (TiCl$_3 \cdot \frac{1}{3}$AlCl$_3$)(MCl$_3$)$_x$ (MgX$_2$)$_y$, wherein M is a transition metal from groups Va and VIa of the Periodic System, X is a halogen, $0.3 \leq x \leq 3$, and $0 \leq y \leq 20$;

(f) a compound formed from mixed crystals containing TiCl$_3$ or TiCl$_2$, AlCl$_3$, and other metal chlorides, such as FeCl$_2$, NiCl$_2$, MoCl$_3$, and MgCl$_2$;

(g) a compound of the formula (MX$_3$)($\phi_n$SiL$_{4-n}$)$_b$, wherein M is a transition metal from groups IVa to VIa of the Periodic System, $\phi$ is an aromatic or polyaromatic ring, optionally substituted, having from 6 to 15 carbon atoms, L is either a halogen atom or a hydroxy group, and $1 \leq n \leq 3$, $0.2 \leq b \leq 2$, the compound being, if appropriate, combined with AlCl$_3$, MgCl$_2$ and/or a halide of a metal from group VIII; and (h) a compound of the formula X$_{m-n}$M(OR)$_n$, wherein M denotes one or more metals from groups Ia, IIa, IIb, IIIb and VIIa of the Periodic System, X is a monovalent inorganic radical, R is a monovalent hydrocarbon radical, m is the valency of M, and $1 \leq n \leq m$, placed in the presence of a halogen derivative of a transition metal from groups IVa to VIa.

The catalytic system comprises further at least one activator selected from the group consisting of the hydrides and the organometallic compounds of metals of groups I to III of the Periodic System. The activator for the catalytic system can be selected from the following:

(a) an alkyl aluminum, such as triethylaluminum, tributylaluminum, triisobutylaluminum, and trioctylaluminum;

(b) a chlorodialkylaluminum, such as chlorodiethylaluminum;

(c) a dichloroalkylaluminum, such as dichloroethylaluminum;

(d) an alkylsiloxalane of the formula:

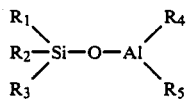

wherein $R_1$, $R_2$, $R_3$, and $R_4$ are hydrocarbon radicals containing from 1 to 10 carbon atoms, and $R_5$ is either a hydrocarbon radical containing from 1 to 10 carbon atoms or a radical of the formula:

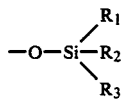

(e) a compound based on an alkylaluminum fluoride having the formulas $(AlR_2F)(AlR_2X)_a$ or $(AlR_2F)(AlR_2H)_b(AlR_3)_c$, wherein R is an alkyl group containing from 1 to 12 carbon atoms, X is a halogen other than fluorine, $0.1 \leq a \leq 0.4$, $0.1 \leq b \leq 0.4$ and $0.05 \leq c \leq 0.2$.

The catalytic system may be deposited on an inert carrier comprising, for example, one or more of the following compounds: $MgCl_2$, $Al_2O_3$, $MoO_3$, $MnCl_2$, $SiO_2$, and $MgO$.

Preferably, the first compound, capable of reducing the transition metal or metals of the catalytic system, is selected from the group consisting of derivatives of organolithium, organomagnesium, organozinc, organocadmium, organomercury derivatives, and carbon monoxide.

In the present invention, the term "at the end of the first stage" is to be understood to mean a time during the first stage when the polymerization or the copolymerization is substantially completed or almost finished. Thus, the first compound can be introduced into the reaction medium in one of the last reaction zones, preferably the last zone, of the reactor or the set of reactors. Alternatively, the first compound is introduced into the reaction medium between either an exit from the last reaction zone and a discharge valve, or the discharge valve and an inlet of the separator.

The introduction of the first compound into the reaction medium can take place at several of these places, and the introduction can be carried out by any suitable means, such as a high pressure pump. The first compound can be injected as a pure form, as a solution, or as an emulsion in a non-reactive solvent, such as a saturated hydrocarbon.

The molar flowrate of the first compound is advantageously between 0.2 and 6 times the molar flowrate of the transition metal or metals of the catalytic system.

The organolithium derivative of the first compound can be methyllithium, ethyllithium, n-propyllithium, isopropyllithium, phenyllithium, and normal, secondary or tertiary butyllithium.

The organomagnesium derivative of the first compound can be a mixed organomagnesium compound of the general formula R-Mg-X, wherein R is an aliphatic, a cycloaliphatic or an aromatic hydrocarbon radical, or an alkylaryl or arylalkyl radical, containin from 1 to 8 carbon atoms, and X is a halogen radical, such as F, Cl, Br, or I.

Examples of the organomagnesium derivative include methyl-magnesium chloride, methyl-magnesium bromide, methyl-magnesium iodide, ethylmagnesium chloride, ethylmagnesium bromide, n-propylmagnesium chloride, isopropylmagnesium chloride, n-butylmagnesium chloride, iso-butylmagnesium chloride, secondary butylmagnesium chloride, tertiary butylmagnesium chloride, n-butylmagnesium bromide, iso-butylmagnesium bromide, secondary butylmagnesium bromide, tertiary butylmagnesium bromide, n-pentylmagnesium chloride, n-hexylmagnesiuum chloride, n-heptylmagnesiuum chloride, n-octylmagnesium chloride, n-pentylmagnesium bromide, n-hexylmagnesium chloride, n-heptylmagnesium chloride, n-octyl magnesium bromide, cyclopentyl magnesium chloride, cyclohexylmagnesium chloride, phenylmagnesium chloride, phenyl magnesium bromide, tolylmagnesium bromide, benzylmagnesium chloride, vinylmagnesium bromide, allylmagnesium chloride and allylmagnesium bromide.

The organomagnesium derivative of the first compound can also be an organomagnesium compound of the general formula R-Mg-R', wherein each of the radicals R and R' can be identical or different, with R and R' having the meaning given above for the radical R of the mixed organomagnesium compounds. As an example, dimethyl magnesium, diphenyl magnesium, dibutylmagnesium, di-n-hexylmagnesium or n-butylethylmagnesium can be used.

Examples of the organozinc derivative of the first compound include dimethylzinc, diethylzinc, di-n-propylzinc, di-n-butyzinc, diphenylzinc, and di-o-tolylzinc.

Examples of the organocadmium derivative of the first compound include dimethylcadmium, diethylcadmium, dipropylcadmium, dibutylcadmium, di-isobutylcadmium and di-isoamylcadmium.

Examples of an organomercury derivative of the first compound include a compound of the general formula R-Hg-X, in which R is a methyl, ethyl, propyl, butyl, amyl, hexyl, phenyl, tolyl, or naphthyl radical and X is chlorine, bromine, or iodine. It is also possible to use a compound of the general formula R-Hg-R', wherein R and R' are generally identical and chosen from among the radicals of methyl, ethyl, propyl, butyl, amyl, hexyl, phenyl, tolyl, biphenyl, benzyl, and naphthyl.

The organometallic derivatives are generaly employed in the form of solutions.

Carbon monoxide can be used as the first compound in the pure state or diluted in an inert gas, such as nitrogen. Alternatively, the carbon monoxide can be in the form of a pressurized solution in a hydrocarbon.

The introduction of at least one of the first compounds, as defined above, into the reaction medium at the end of the first stage provides the significant advantages of interrupting rapidly the polymerization or copolymerization reaction and avoiding the lowering of the average molecular weight of the polymers or copolymers being formed. Particularly, the introduction of the first compound eliminates or greatly reduces the establishment of a temperature gradient in the separator.

To improve further the result obtained, and, in particular, to avoid completely the formation of polymers in the recycling conduits after the separator, the present process further includes the steps of introducing a second compound, during the second stage, into the reaction medium and/or a third compound, during the third stage, into a stream of recycled unreacted monomers. The second and the third compounds can be selected from the group consisting of the amides of saturated or unsaturated organic acids containing from 12 to 22 carbon atoms; polyalkylene polyols containing from 4 to 500 carbon atoms; and compounds containing at least 2 epoxide functional units.

In the present invention, the term "during the second stage" is to be understood to mean that the second compound is introduced into the reaction, which is at a separation pressure, either just before or during the separating step.

In the present invention, the term "during the third stage" is to be understood to mean that the third compound is introduced into the stream of recycled monomers after the separating step and before the recompressing step. Preferably, the third compound is introduced before passing the gases, carrying the recycled monomers, through a cold trap.

The amides of saturated organic acids, for the second and third compounds, can be either for example, lauramide, myristamide, palmitamide, stearamide, or arachidamide. The amides of unsaturated organic acids, for the second and third compounds, can be either oleamide, elaidamide, erucamide, or brassidamide.

The polyalkylene polyols, which can be used as the second or the third compound, include polyethylene glycols, having a molecular weight between 200 and 10,000; polypropylene glycols, having a molecular weight between 250 and 4,000; co-telomeric poly(ethylene-propylene) glycols; and combinations thereof.

The compounds containing at least two epoxide functional units, which can be used according to the invention, are, preferably epoxydized soyabean oil, epoxy derivatives of esters of polyunsaturated organic acids, and epoxy derivatives of compounds having several aromatic rings, such as the diglycidyl ether of bisphenol A.

The quantity of the second and third compounds that are introduced during the second or third stages is preferably between 0.001 and 0.1 moler per metric ton of the recycled monomers.

With reference to the FIGURE, a detailed description of a polymerization plant for carrying out the present process is shown diagrammatically. The plant apparatus includes a polymerization reactor (1), a reactor discharge valve (2), an intermediate pressure separator (3), a low-pressure separation hopper (11), a standard cyclone (4) mounted on a catchpot (5), a cooler (6), a second catchpot (7), a secondary compressor (8), a primary compressor (9), and a feed conduit for the fresh monomers (10).

The first compound is introduced into the reaction medium during the first stage, when the polymerization is substantially complete, at points (C), (D), and (E) in the FIGURE.

The second compound is introduced into the reaction medium during the second stage at point E.

Finally, the third compound is introduced into the stream of recycled unreacted monomers during the third stage, at points (A) and (B).

Following are examples of the present invention, which are intended to be merely exemplary of the present invention.

EXAMPLE 1 (comparative)

The plant used is shown diagrammatically in the FIGURE, as described above. The apparatus comprised a 3-zone autoclave reactor (1), whose operating temperatures were 210°, 260°, and 280° C. A mixture of 60% by weight ethylene and 40% by weight but-1-ene was copolymerized in the reactor (1), at a pressure of 800 bars, in the presence of both a catalytic system of $(TiCl_3 \cdot \frac{1}{3}AlCl_3 \cdot VCl_3)/3(C_2H_5)_3Al$, which was introduced into the first two reaction zones, and 0.1 mole % of hydrogen. The copolymer produced has a melt index, measured according to ASTM Standard D 1238-73, between 1 and 1.5 dg/min. The mean residence time of the catalytic system in the reactor was 40 seconds. The separator usually operated at a pressure of 250 bars.

The results obtained are collated in the table below, wherein:

$\Delta T$ is the temperature gradient between the top and bottom of the separator (3), in °C., and CB2 is the concentration of but-2-ene in % by weight, contained in the recycled gases. The gas test sampling is being carried out at the outlet of the catchpot (7).

Some difficulty occurred in purging the catchpot (7) and, very quickly, a very considerable increase in the pressure drop between the outlet of the separator (3) and the inlet of the secondary compressor (8) was observed.

EXAMPLES 2 and 3

The plant and the polymerization or copolymerization conditions were the same as in Examle 1.

In Example 2, carbon monoxide was introduced at injection point (C), in a ratio of 1 mole per gram-atom of titanium plus vanadium, which was present in the catalytic system. In Example 2, the carbon monoxide was in a solution of methylcyclohexane. In Example 3, butyllithium was injected in the form of a solution at a concentration of 1 mole/liter in heptane. The temperature of the third reaction zone fell by approximately 15° C.

The catchpot (7) was less difficult to purge than in Example 1, and no major increase was found in the pressure drop between the separator outlet (3) and the inlet of the secondary compressor (8).

EXAMPLE 4 (Comparative)

The plant and the polymerization or copolymerization conditions were the same as in Example 1.

According to the teaching of French Pat. No. 2,302,305, calcium stearate was injected at point (C), in a ratio of 1 mole per gram-atom of titanium plus vanadium. The temperature of the third reaction zone fell by approximately 10° C. The results obtained are given in the table below.

EXAMPLE 5

The plant and the polymerization or copolymerization conditions are the same as in Example 1. At injection point (C), a solution containing 1 mole/liter of butyllithium in heptane was injected in a ratio of 1 mole of butyllithium per gram-atom of titanium plus vanadium present in the catalytic system. The temperature of the third reaction zone was lowered by 15° C.

0.027 mole of stearamide per metric ton of a mixture of ethylene and but-1-ene, which was contained in the recycle gases, was introduced at each of injection points (E), (A) and (B). The stearamide was employed as a solution of 50 g/liter in paraffin oil.

The results obtained are as follows:

The concentration of but-2-ene, contained in the recycled gases sampled at the catchpot outlet (7), was equal to 1.5%.

The greases that were collected in the cyclone (4) and in the catchpot (7) had, respectively, a melt index equal to 50 and 40 dg/min, as measured according to ASTM Standard D 1238-73.

The pressure drop between the separator outlet (3) and the inlet of the secondary compressor (8), which is 35 bars at the outset, remained at 35 bars after 50 hours. The pressure drop then rose very slightly to 40 bars after 100 hours, and to 50 bars after 200 hours of continuous operation.

The thermal gradient between the top and the bottom of the separator (3) was insignificant.

TABLE

| Example | Compound | Quantity | ΔT °C. | CB2 |
|---------|----------|----------|--------|-----|
| 1 | — | — | 25 | 6 |
| 2 | Carbon monoxide | 0.25 | 0 | 0.5 |
| 3 | Butyllithium | 1.25 | 0 | 2 |
| 4 | Calcium stearate | 1 | 18 | 5 |

Other embodiments of the invention will be apparent to one skilled in the art from a consideration of the specification of the practice of the invention disclosed herein. It is intended that the specification and examples be considered as exemplary only, with the true scope and spirit of the invention being indicated by the claims.

What is claimed is:

1. A process for the continuous manufacture of homopolymers of ethylene and copolymers of ethylene with at least one alpha-olefin containing 3 to 8 carbon atoms, comprising the steps of:
    (a) introducing an ethylene monomer or an ethylene monomer and at least one alpha-olefin monomer containing 3 to 8 carbon atoms, and a catalytic system into a first stage reactor to form a reaction medium for polymerizing the monomers at a temperature between 180° and 320° C. and at a pressure between 300 and 2,500 bars, the catalytic system comprising a halogenated compound of a transition metal from groups IVa to VIa of the Periodic System and at least one activator selected from the group consisting of hybrides and organometallic compounds of metals of Groups I to III of the Periodic System, the molar ratio of the activator to the transition metal compound in the catalytic system being between 1 and 10;
    (b) introducing into the reaction medium, during a first stage when the polymerization is substantially complete, a first compound which reduces the transition metal of the catalytic system; said first compound being selected from the group consisting of organolithium, organomagnesium, organozinc, organocadmium, organomercury derivatives, and carbon monoxide, and having a molar flowrate between 0.2 and 6 times the molar flowrate of the transition metal or metals of the catalytic system;
    (c) separating in the reaction medium the formed polymers and copolymers from the unreacted monomers by means of a separator, during a second stage at a pressure of between 100 and 500 bars, and introducing, during the second stage, into the reaction medium a second compound selected from the group consisting of amides of saturated or unsaturated organic acids containing from 12 to 22 carbon atoms and polyalkylene polyols containing from 4 to 500 carbon atoms;
    (d) recycling the unreacted monomers during a third stage; and
    (e) recompressing the recycled unreacted monomers during a fourth stage up to the polymerization pressure;
    whereby the first compound introduced in step (b) substantially reduces the temperature gradient within the separator in step (c).

2. A process of claim 1, wherein the quantity of the second compound is between 0.001 and 0.1 mole per metric ton of recycled monomers.

3. A process of claim 1 wherein the amide is selected from the group consisting or erucamide, oleamide and stearamide.

4. A process according to claim 1, wherein the polyalkylene polyol is polyethylene glycol having a molecular weight between 200 and 10,000.

5. A process of claim 1, wherein the polyalkylene polyol is polypropylene glycol having a molecular weight between 250 and 4,000.

6. A process of claim 1, wherein the polyalkylene polyol is a block copolymer comprising ethylene glycol units and propylene glycol units.

7. A process for the continuous manufacture of homopolymers of ethylene and copolymers of ethylene with at least one alpha-olefin containing 3 to 8 carbon atoms, comprising the steps of:
    (a) introducing an ethylene monomer or an ethylene monomer and at least one alpha-olefin monomer containing 3 to 8 carbon atoms, and a catalytic system into a first stage reactor to form a reaction medium for polymerizing the monomers at a temperature between 180° and 320° C. and at a pressure between 300 and 2,500 bars, the catalytic system comprising a halogenated compound of a transition metal from groups IVa to VIa of the Periodic System and at least one activator selected from the group consisting of hydrides and organometallic compounds of metals of Groups I to III of the Periodic System, the molar ratio of the activator to the transition metal compound in the catalytic system being between 1 and 10;
    (b) introducing into the reaction medium, during a first stage when the polymerization is substantially complete, a first compound which reduces the transition metal of the catalytic system; said first compound being selected from the group consisting of organolithium, organomagnesium, organozinc, organocadmium, organomercury derivatives, and carbon monoxide, and having a molar flowrate between 0.2 and 6 times the molar flowrate of the transition metal or metals of the catalytic system;
    (c) separating in the reaction medium the formed polymers and copolymers from the unreacted monomers by means of a separator, during a second stage at a pressure of between 100 and 500 bars;
    (d) recycling the unreacted monomers during a third stage, and introducing, during the third stage, into a stream of recycled unreacted monomers a third compound selected from the group consisting of: amides of saturated or unsaturated organic acids containing from 12 to 22 carbon atoms; polyalkylene polyols containing from 4 to 500 carbon atoms; and compounds containing at least 2 epoxide functional units; and
    (e) recompressing the recycled unreacted monomers during a fourth stage up to the polymerization pressure;

wherein the first compound introduced in step (b) substantially reduces the temperature gradient within the separator in step (c).

8. A process of claim 7, wherein the quantity of the third compound is between 0.001 and 0.1 mole per metric ton of recycled monomers.

9. A process of claim 7, wherein the amide is selected from the group consisting of erucamide, oleamide, and stearamide.

10. A process of claim 7, wherein the polyalkylene polyol is polyethylene glycol having a molecular weight between 200 and 10,000.

11. A process of claim 7, wherein the polyalkylene polyol is polypropylene glycol having a molecular weight between 250 and 4,000.

12. A process of claim 7, wherein the polyalkylene polyol is a block copolymer comprising ethylene glycol units and propylene glycol units.

13. A process of claim 7, wherein the third compound containing at least 2 epoxide functional units is epoxidized soyabean oil.

14. A process of claim 1, further comprising the step of introducing, during the third stage, into a stream of recycled unreacted monomers a third compound selected from the group consisting of: amides of saturated or unsaturated organic acids containing from 12 to 22 carbon atoms; polyalkylene polyols containing from 4 to 500 carbon atoms; and compounds containing at least 2 epoxide functional units.

15. A process for the continuous manufacture of homopolymers of ethylene and copolymers of ethylene with at least one alpha-olefin containing 3 to 8 carbon atoms, comprising the steps of:
(a) introducing an ethylene monomer or an ethylene monomer and at least one alpha-olefin monomer containing 3 to 8 carbon atoms, and a catalytic system into a first stage reactor to form a reaction medium for polymerizing the monomers at a temperature between 180° and 320° C. and at a pressure between 300 and 2,500 bars, the catalytic system comprising a halogenated compound of a transition metal from groups IVa to VIa of the Periodic System and at least one activator selected from the group consisting of hydrides and organometallic compounds of metals of Groups I to III of the Periodic System, the molar ratio of the activator to the transition metal compound in the catalytic system being between 1 and 10;
(b) introducing into the reaction medium, during a first stage when the polymerization is substantially complete, a first compound which reduces the transition metal of the catalytic system;
said first compound being selected from the group consisting of organolithium, organomagnesium, organozinc, organocadmium, organomercury derivatives, and carbon monoxide, and having a molar flowrate between 0.2 and 6 times the molar flowrate of the transition metal or metals of the catalytic system;
(c) separating in the reaction medium the formed polymers and copolymers from the unreacted monomers by means of a separator, during a second stage at a pressure of between 100 and 500 bars, and introducing, during the second stage, into the reaction medium a second compound selected from the group consisting of amides of saturated or unsaturated organic acids containing from 12 to 22 carbon atoms and polyalkylene polyols selected from the group consisting of:
(1) polyethylene glycols having a molecular weight between 200 and 10,000;
(2) polypropylene glycols having a molecular weight between 250 and 4,000;
(3) co-telomeric poly(ethylene-propylene) glycols; and
(4) combinations thereof;
(d) recycling the unreacted monomers during a third stage; and
(e) recompressing the recycled unreacted monomers during a fourth stage up the polymerization pressure;
whereby the first compound introduced in step (b) substantially reduces the temperature gradient within the separator in step (c).

16. A process of claim 15, wherein the quantity of the second compound is between 0.001 and 0.1 mole per metric ton of recycled monomers.

17. A process of claim 15, wherein the amide is selected from the group consisting of erucamide, oleamide, and stearamide.

18. A process of claim 15, wherein the polyalkylene polyol is polyethylene glycol having a molecular weight between 200 and 10,000.

19. A process for the continuous manufacture of homopolymers of ethylene and copolymers of ethylene with at least one alpha-olefin containing 3 to 8 carbon atoms, comprising the steps of:
(a) introducing an ethylene monomer or an ethylene monomer and at least one alpha-olefin monomer containing 3 to 8 carbon atoms, and a catalytic system into a first stage reactor to form a reaction medium for polymerizing the monomers at a temperature between 180° and 320° C. and at a pressure between 300 and 2,500 bars, the catalytic system comprising a halogenated compound of a transition metal from groups IVa to VIa of the Periodic System and at least one activator selected from the group consisting of hydrides and oragnometallic compounds of metals of Groups I to III of the Periodic System, the molar ratio of the activator to the transition metal compound in the catalytic system being between 1 and 10;
(b) introducing into the reaction medium, during a first stage when the polymerization is substantially complete, a first compound which reduces the transition metal of the catalytic system;
said first compound being selected from the group consisting of organolithium, organomagnesium, organozinc, organocadmium, organomercury derivatives, and carbon monoxide, and having a molar flowrate between 0.2 and 6 times the molar flowrate of the transition metal or metals of the catalytic system;
(c) separating in the reaction medium the formed polymers and copolymers from the unreacted monomers by means of a separator, during a second stage at a pressure of between 100 and 500 bars;
(e) recycling the unreacted monomers during a third stage, and introducing, during the third stage, into a stream of recycled unreacted monomers a third compound selected from the group consisting of the amides of saturated or unsaturated organic acids containing from 12 to 22 carbon atoms and polyalkylene polyols selected the group consisting of:

(1) polyethylene glycols having a molecular weight between 200 and 10,000;

(2) polypropylene glycols having a molecular weight between 250 and 4,000;

(3) co-telomeric poly(ethylene-propylene) glycols; and (4) combinations thereof;

(e) recompressing the recycled unreacted monomers during a fourth stage up to the polymerization pressure;

whereby the first compound introduced in step (b) substantially reduces the temperature gradient within the separator in step (c).

20. A process of claim 19, wherein the quantity of the third compound is between 0.001 and 0.1 mole per metric ton of recycled monomers.

21. A process of claim 19, wherein the amide is selected from the group consisting of erucamide, oleamide, and stearamide.

22. A process of claim 19, wherein the polyalkylene polyol is polyethylene glycol having a molecular weight between 200 and 10,000.

23. A process of claim 15, further comprising the steps of introducing, during the third stage, into a stream of recycled unreacted monomers a third compound selected from the group consisting of the amides of saturated or unsaturated organic acids containing from 12 to 22 carbon atoms and polyalkylene polyols selected from the group consisting of: p1 (1) polyethylene glycols having a molecular weight between 200 and 10,000;

(2) polypropylene glycols having a molecular weight between 250 and 4,000;

(3) co-telomeric poly(ethylene-propylene) glycols; and (4) combinations thereof.

24. A process for the continuous manufacture of homopolymers of ethylene and copolymers of ethylene with at least one alpha-olefin containing 3 to 8 carbon atoms, comprising the steps of:

(a) introducing an ethylene monomer or an ethylene monomer and at least one alpha-olefin monomer containing 3 to 8 carbon atoms, and a catalytic system into a first stage reactor to form a reaction medium for polymerizing the monomers at a temperature between 180° and 320° C. and at a pressure between 300 and 2,500 bars, the catalytic system comprising a halogenated compound of a transition metal from groups IVa to VIa of the Periodic System and at least one activator selected from the group consisting of hydrides and organometallic compounds of metals of Groups I to III of the Periodic System, the molar ratio of the activator to the transition metal compound in the catalytic system being between 1 and 10;

(b) introducing into the reaction medium, during a first stage when the polymerization is substantially complete, a first compound capable of reducing the transition metal of the catalytic system, said first compound being selected from the group consisting of organolithium, organomagnesium, organozinc, organocadmium, and organomercury derivatives, and having a molar flowrate between 0.2 and 6 times the molar flowrate of the transition metal or metals of the catalytic system;

(c) separating in the reaction medium the formed polymers and copolymers from the unreacted monomers by means of a separator, during a second stage at a pressure of between 100 and 500 bars;

(d) recycling the unreacted monomers during a third stage; and (e) recompressing the recycled unreacted monomers during a fourth stage of to the polymerization pressure;

whereby the first compound introduced in step (b) substantially reduces the temperature gradient within the separator in step (c).

25. A process of claim 24, further comprising the step of introducing, during the second stage, into the reaction medium a second compound selected from the group consisting of amides of saturated or unsaturated organic acids containing from 12 to 22 carbon atoms and polyalkylene polyols containing from 4 to 500 carbon atoms.

26. A process of claim 24, further comprising the step of introducing, during the third stage, into a stream of recycled unreacted monomers a third compound selected from the group consisting of: amides of saturated or unsaturated organic acids containing from 12 to 22 carbon atoms; polyalkylene polyols containing from 4 to 500 carbon atoms; and compounds containing at least 2 epoxide functional units.

27. A process of claim 24, wherein the organolithium derivative is butyllithium.

* * * * *